United States Patent
Renault (10) Patent No.: US 10,920,681 B2
(45) Date of Patent: Feb. 16, 2021

(54) PRESSURE CONTROL VALVE SYSTEM

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/469,350

(22) PCT Filed: Dec. 13, 2016

(86) PCT No.: PCT/IB2016/001907
§ 371 (c)(1),
(2) Date: Jun. 13, 2019

(87) PCT Pub. No.: WO2018/109514
PCT Pub. Date: Jun. 21, 2018

(65) Prior Publication Data
US 2019/0308485 A1    Oct. 10, 2019

(51) Int. Cl.
*F02D 19/02*   (2006.01)
*B60H 1/00*    (2006.01)
(Continued)

(52) U.S. Cl.
CPC ....... *F02D 19/022* (2013.01); *B60H 1/00014* (2013.01); *B60H 1/00735* (2013.01);
(Continued)

(58) Field of Classification Search
None
See application file for complete search history.

(56) References Cited

U.S. PATENT DOCUMENTS 3,785,391 A * 1/1974 Miller .................. F16K 11/078
                                                    137/119.03
3,880,193 A * 4/1975 Lewis .................. F16L 55/045
                                                    138/26
(Continued)

FOREIGN PATENT DOCUMENTS

CN    105422318 A    3/2016
DE    19627538 A1    1/1998
EP    1232898 A2     8/2002

OTHER PUBLICATIONS

"Control Tutorials for Matlab and Simulink—Introduction: Digital Controller Design"; 10 pages.
(Continued)

*Primary Examiner* — Kevin R Steckbauer
(74) *Attorney, Agent, or Firm* — Cantor Colburn LLP (57) ABSTRACT

A pressure control valve system includes a pressure control valve, an electric actuator, an upstream pressure sensor, a downstream pressure sensor, and a controller. The electric actuator adjustably opens and closes the pressure control valve. The upstream pressure sensor measures pressure upstream of the pressure control valve and outputs a plurality of sequential upstream pressure signals over a plurality of successive periods in time. The downstream pressure sensor measures pressure downstream of the pressure control valve and outputs a plurality of sequential downstream pressure signals over the plurality of successive periods in time. The a controller receives the upstream and downstream pressure signals and outputs a plurality of sequential command signals to the electric actuator. Each sequential command signal is based on a respective one of the plurality of sequential downstream and upstream pressure signals for a respective one of the plurality of successive periods in time.

14 Claims, 5 Drawing Sheets

(51) Int. Cl.
*F16K 17/04* (2006.01)
*F16K 31/02* (2006.01)
*G01L 27/00* (2006.01)
*G05D 16/20* (2006.01)
*F02M 21/02* (2006.01)

(52) U.S. Cl.
CPC ............ *F02D 19/027* (2013.01); *F02M 21/02* (2013.01); *F02M 21/023* (2013.01); *F02M 21/0215* (2013.01); *F02M 21/0233* (2013.01); *F16K 17/048* (2013.01); *F16K 31/02* (2013.01); *G01L 27/007* (2013.01); *G05D 16/2013* (2013.01); *B60H 2001/00171* (2013.01); *F02D 2200/0602* (2013.01)

(56) References Cited

U.S. PATENT DOCUMENTS

| | | | | | |
|---|---|---|---|---|---|
| 3,924,652 | A | * | 12/1975 | Kah, Jr. | F16K 31/528 137/119.03 |
| 4,125,124 | A | * | 11/1978 | Kah | A01G 25/162 137/119.03 |
| 4,492,247 | A | * | 1/1985 | Lockwood | A01G 25/162 137/119.03 |
| 4,757,696 | A | * | 7/1988 | Gannaway | F25B 43/006 62/503 |
| 4,987,917 | A | * | 1/1991 | Kah, Jr. | A01G 25/162 137/119.03 |
| 5,022,426 | A | * | 6/1991 | Fischer | F16K 31/36 137/119.03 |
| 5,675,982 | A | * | 10/1997 | Kirol | F25B 41/062 62/225 |
| 5,738,076 | A | * | 4/1998 | Kim | F02M 35/10216 123/527 |
| 6,321,550 | B1 | * | 11/2001 | Chopko | F25B 27/00 62/196.2 |
| 7,064,671 | B2 | * | 6/2006 | Vanderah | G01F 1/363 340/636.1 |
| 7,819,333 | B2 | | 10/2010 | Lou et al. | |
| 8,333,171 | B2 | * | 12/2012 | Lund | F02D 19/081 123/1 A |
| 8,493,232 | B2 | * | 7/2013 | Cornwall | G01D 4/004 340/870.02 |
| 8,909,457 | B2 | * | 12/2014 | Puckett | F02D 19/0623 701/107 |
| 10,256,659 | B2 | * | 4/2019 | Ferguson | H02J 7/025 |
| 10,527,005 | B2 | * | 1/2020 | Singh | F02D 19/0694 |
| 10,625,561 | B2 | * | 4/2020 | Neu | F25D 11/022 |
| 2001/0054967 | A1 | * | 12/2001 | Vanderah | G01F 1/363 340/626 |
| 2011/0023853 | A1 | * | 2/2011 | Lund | F02D 19/0665 123/590 |
| 2011/0056571 | A1 | * | 3/2011 | Bayliff | F17C 7/00 137/14 |
| 2012/0186560 | A1 | * | 7/2012 | Lund | F02D 41/0027 123/495 |
| 2014/0138045 | A1 | * | 5/2014 | Sloane | B60H 1/3226 165/42 |
| 2014/0145101 | A1 | * | 5/2014 | Ishibashi | F16K 31/0675 251/129.15 |
| 2014/0188372 | A1 | * | 7/2014 | Puckett | F02D 19/0694 701/104 |
| 2017/0098954 | A1 | * | 4/2017 | Ferguson | B60D 1/62 |
| 2017/0136844 | A1 | * | 5/2017 | Neu | B60H 1/00014 |
| 2017/0356391 | A1 | * | 12/2017 | Singh | F02M 43/04 |
| 2018/0245825 | A1 | * | 8/2018 | Koelsch | B60H 1/00364 |
| 2018/0264909 | A1 | * | 9/2018 | Lanuzel | B60H 1/3232 |
| 2019/0202267 | A1 | * | 7/2019 | Renault | F02D 41/22 |
| 2019/0288350 | A1 | * | 9/2019 | Saroka | B60H 1/00278 |
| 2019/0292975 | A1 | * | 9/2019 | Hou | B60H 1/00014 |
| 2019/0308485 | A1 | * | 10/2019 | Renault | F16K 17/048 |
| 2019/0360433 | A1 | * | 11/2019 | Poolman | B60H 1/00014 |
| 2020/0055375 | A1 | * | 2/2020 | Renault | F02D 41/22 |
| 2020/0130645 | A1 | * | 4/2020 | Srnec | B60R 25/04 |
| 2020/0139790 | A1 | * | 5/2020 | Burchill | B60H 1/3222 |
| 2020/0164738 | A1 | * | 5/2020 | Renault | B60K 13/04 |
| 2020/0164785 | A1 | * | 5/2020 | Renault | F25D 11/003 |

OTHER PUBLICATIONS

"Pressure Gradient" from Wikipedia; printed Aug. 30, 2017; 2 pages.
Search Report for Application No. PCT/IB2016/001907 dated Sep. 12, 2017; 6 pages.
Written Opinion for Application No. PCT/IB2016/001907 dated Sep. 12, 2017; 14 pages.

* cited by examiner

PRESSURE CONTROL VALVE SYSTEM

CROSS-REFERENCE TO RELATED APPLICATIONS

This application claims the benefit of PCT/IB2016/001907 filed Dec. 13, 2016, which is incorporated herein by reference in its entirety.

BACKGROUND

The present disclosure relates to pressure control valve systems and, more particularly, to a compressed, natural gas, pressure control valve system for a transport refrigeration unit.

Traditionally, a transport refrigeration unit, such as those utilized to transport cargo via sea, rail, or road, is a cargo truck, tractor trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A combustion engine system may provide the necessary power to run refrigeration unit.

In some applications, the combustion engine may combust a compressed natural gas stored in a high pressure gas tank. For such systems, a pressure control valve may be required to step the stored gas pressure down to an engine service pressure. For large differential pressures between the tank and the engine, complications may exist leading to component wear and/or the need for more complex and expensive pressure control systems. Further enhancements in the design of pressure control valve systems are therefore desirable.

BRIEF DESCRIPTION

A pressure control valve system according to one, non-limiting, embodiment of the present disclosure includes a pressure control valve; an electric actuator configured to adjustably open and close the pressure control valve; an upstream pressure sensor configured to measure pressure upstream of the pressure control valve and output a plurality of sequential upstream pressure signals over a plurality of successive periods in time; a downstream pressure sensor configured to measure pressure downstream of the pressure control valve and output a plurality of sequential downstream pressure signals over the plurality of successive periods in time; and a controller configured to receive the upstream and downstream pressure signals and output a plurality of sequential command signals to the electric actuator, wherein each sequential command signal is based on a respective one of the plurality of sequential downstream and upstream pressure signals for a respective one of the plurality of successive periods in time.

Additionally to the foregoing embodiment, each period in time of the plurality of successive periods in time are equal to one-another.

In the alternative or additionally thereto, in the foregoing embodiment, the controller includes a processor and a computer readable storage medium.

In the alternative or additionally thereto, in the foregoing embodiment, the pressure control valve flows an expandable gas.

In the alternative or additionally thereto, in the foregoing embodiment, the controller is preprogrammed with a pressure gradient curve associated with the plurality of successive periods in time and a change in a pressure gradient for each period in time of the plurality of successive periods in time, and the plurality of sequential command signals are based on the pressure gradient curve.

In the alternative or additionally thereto, in the foregoing embodiment, the plurality of sequential command signals are each associated with a variable electric power sent to the electric actuator to control speed of the pressure control valve.

In the alternative or additionally thereto, in the foregoing embodiment, the plurality of sequential command signals are a plurality of sequential open command signals.

In the alternative or additionally thereto, in the foregoing embodiment, the plurality of sequential command signals are a plurality of sequential open command signals and the pressure gradient curve is preprogrammed to prevent hammer fluid effects.

In the alternative or additionally thereto, in the foregoing embodiment, the plurality of sequential open command signals causes a progressive opening of the pressure control valve.

In the alternative or additionally thereto, in the foregoing embodiment, each one of the plurality of sequential open command signals is generally a pulse lasting for a time period that is equivalent to or less than each one of the plurality of periods in time.

A transport refrigeration unit according to another, non-limiting, embodiment includes a compressor constructed and arranged to compress a refrigerant; a combustion engine constructed and arranged to generate power for running at least the compressor; a high pressure gas tank; a gas line connected between the high pressure hydrocarbon gas tank and the combustion engine for flowing the hydrocarbon gas from the high pressure gas tank to the combustion engine; a pressure control valve disposed in the gas line; an electric actuator constructed and arranged to reposition the pressure control valve between closed and open positions thereby controlling a pressure differential of the hydrocarbon gas across the pressure control valve; an upstream pressure sensor configured to measure pressure upstream of the pressure control valve and output a plurality of sequential upstream pressure signals over a plurality of successive periods in time; a downstream pressure sensor configured to measure pressure downstream of the pressure control valve and output a plurality of sequential downstream pressure signals over the plurality of successive periods in time; and a controller configured to receive the upstream and downstream pressure signals and output a plurality of sequential command signals to the electric actuator, wherein each sequential command signal is based on a respective one of the plurality of sequential downstream and upstream pressure signals for a respective one of the plurality of successive periods in time.

Additionally to the foregoing embodiment, the hydrocarbon gas is a compressed natural gas.

In the alternative or additionally thereto, in the foregoing embodiment, each period in time of the plurality of successive periods in time are equal to one-another.

In the alternative or additionally thereto, in the foregoing embodiment, each one of the plurality of sequential command signals is generally a pulse of power for operating the electric actuator and lasting for a time period that is equivalent to or less than each one of the plurality of periods in time.

In the alternative or additionally thereto, in the foregoing embodiment, each one of the plurality of sequential command signals may include an electric current that is different than an electric current of another sequential command signal for varying operating speed of the pressure control valve from one period in time of the plurality of successive periods in time to the next period in time.

In the alternative or additionally thereto, in the foregoing embodiment, the plurality of sequential command signals are a plurality of sequential open command signals.

In the alternative or additionally thereto, in the foregoing embodiment, the plurality of sequential open command signals causes a progressive opening of the pressure control valve.

In the alternative or additionally thereto, in the foregoing embodiment, the compressed natural gas in the high pressure gas tank is at about a maximum of 200 bars nominal pressure, and the natural gas located downstream of the pressure control valve is at about 10 to 15 bars service pressure.

In the alternative or additionally thereto, in the foregoing embodiment, the controller is preprogrammed with a pressure gradient curve associated with the plurality of successive periods in time and a change in a pressure gradient for each period in time of the plurality of successive periods in time, and the plurality of sequential command signals are based on the pressure gradient curve.

A method of operating an expandable-fluid pressure control valve system according to another, non-limiting, embodiment includes measuring upstream fluid pressure at an upstream side of a pressure control valve for each one of a plurality of successive periods in time; measuring downstream fluid pressure at a downstream side of the pressure control valve for each one of the plurality of successive periods in time; sending upstream and downstream fluid pressure signals to a controller; and sending a plurality of sequential command signals by the controller and to an electric actuator for repositioning the pressure control valve, wherein each command signal of the plurality of sequential command signals is associated with the upstream and downstream fluid pressure signals for each respective one of the plurality of successive periods in time.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
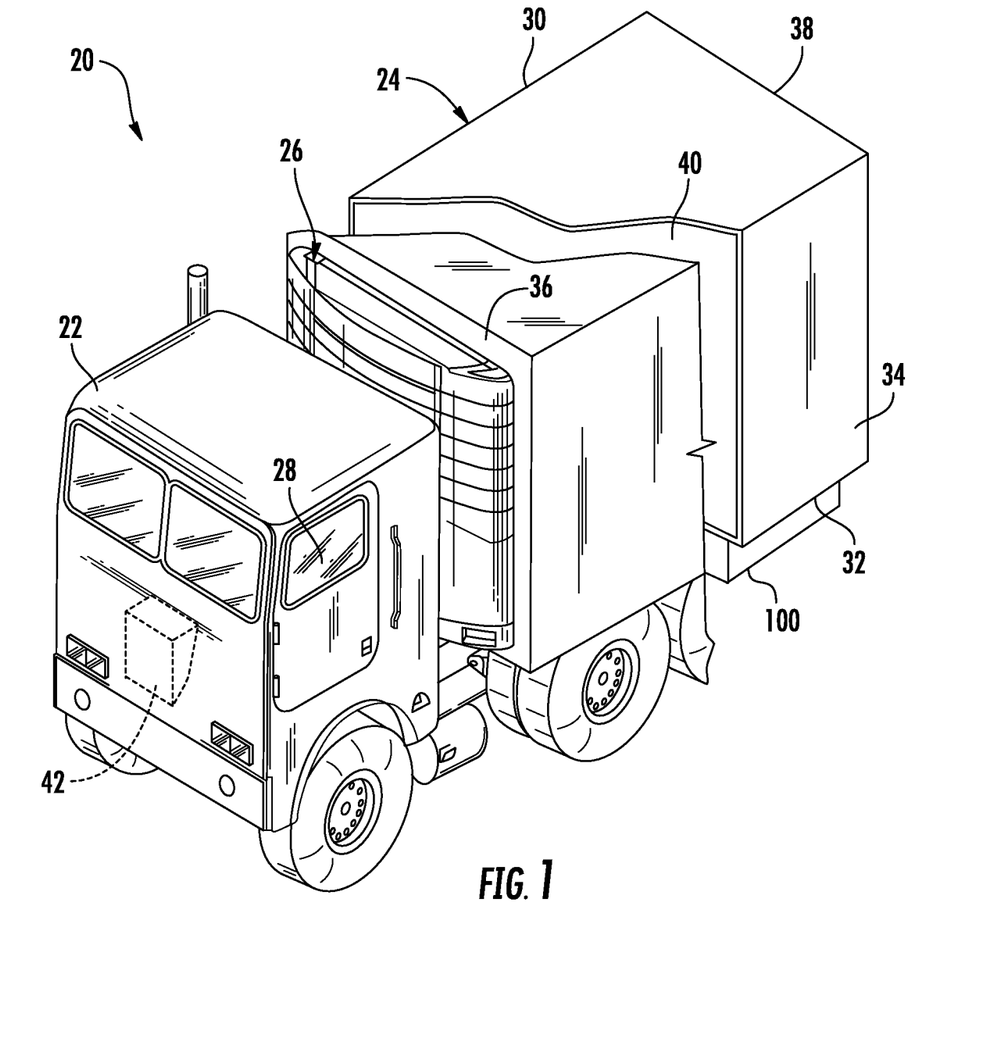
FIG. 1 is a perspective view of a tractor trailer system having a transport refrigeration unit as one, non-limiting, embodiment of the present disclosure.

Referring to FIG. 1, a tractor trailer system 20 of the present disclosure is illustrated. The tractor trailer system 20 may include a tractor or truck 22, a trailer 24 and a transport refrigeration unit 26. The tractor 22 may include an operator's compartment or cab 28 and a combustion engine 42 that is part of the powertrain or drive system of the tractor 22. The trailer 24 may be coupled to the tractor 22 and is thus pulled or propelled to desired destinations. The trailer 24 may include a top wall 30, a bottom wall 32 opposed to and space from the top wall 30, two side walls 34 spaced from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38, together, define the boundaries of a cargo compartment 40. It is contemplated and understood that the cargo compartment may also be divided into two or more smaller compartments for different cargo temperature requirements.

The trailer 24 is generally constructed to store a cargo (not shown) in the compartment 40. The tractor 22 and the trailer 24 is one, non-limiting, example of an application for the transport refrigeration unit 26, which may be integrated into the trailer 24 and generally mounted to the front wall 36. The cargo is maintained at a desired temperature by cooling of the compartment 40 via the transport refrigeration unit 26 that circulates air into and through the cargo compartment 40 of the trailer 24. It is contemplated and understood that the transport refrigeration unit 26 may be applied to any transport container and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

Figure 2:
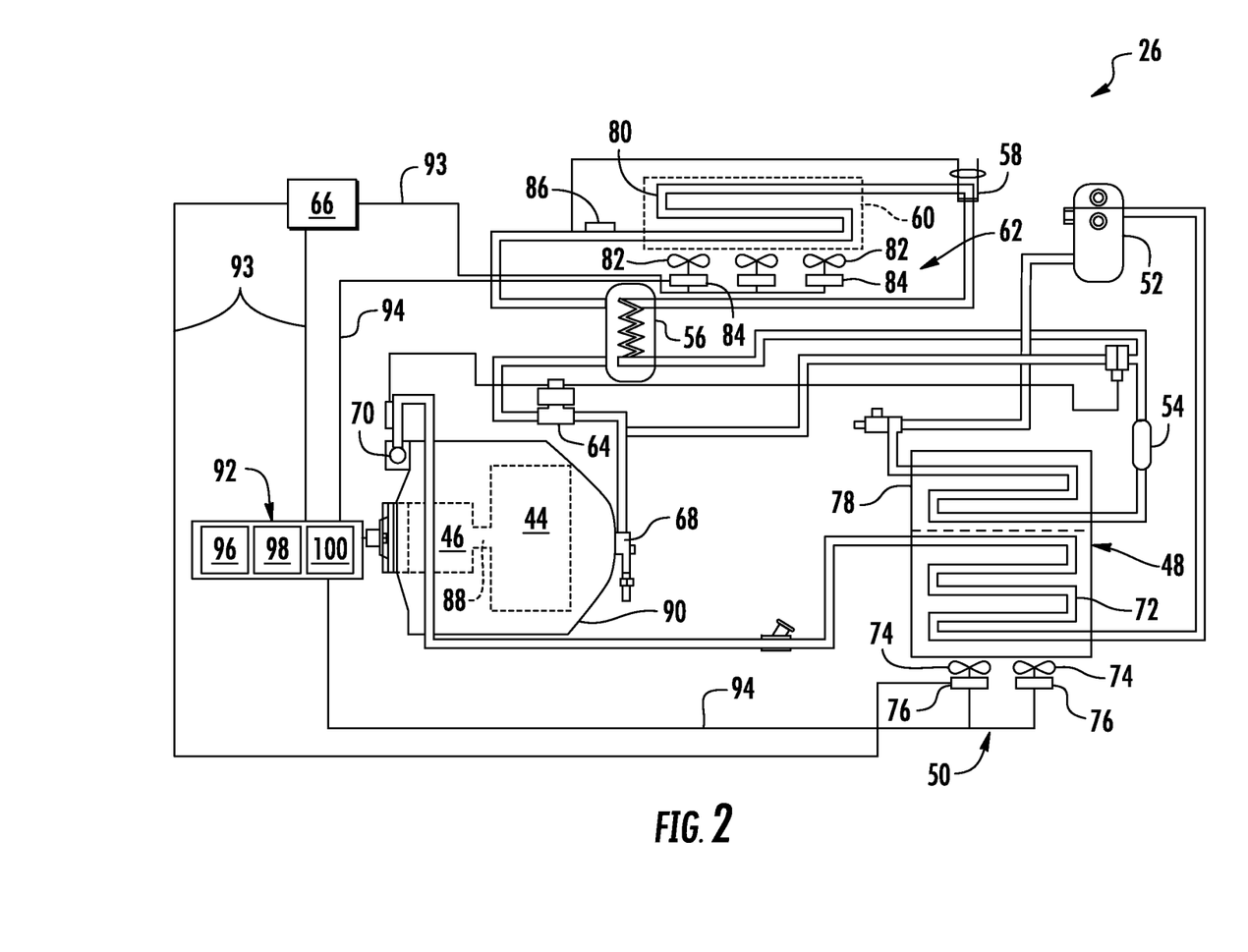
FIG. 2 is a schematic of the transport refrigeration unit.

Referring to FIGS. 1 and 2, the transport refrigeration unit 26 may include a compressor 44, an electric compressor motor 46, a condenser heat exchanger 48 that may be air cooled, a condenser fan assembly 50, a receiver 52, a filter dryer 54, a heat exchanger 56, a thermostatic expansion valve 58, an evaporator heat exchanger 60, an evaporator fan assembly 62, a suction modulation valve 64, and a controller 66 that may include a computer-based processor (e.g., microprocessor) and a computer readable and writeable storage medium. Operation of the transport refrigeration unit 26 may best be understood by starting at the compressor 44, where the suction gas (e.g., refrigerant) enters the compressor at a suction port 68 and is compressed to a higher temperature and pressure. The refrigerant gas is emitted from the compressor 44 at an outlet port 70 and may then flow into tube(s) 72 of the condenser heat exchanger 48.

Air flowing across a plurality of condenser coil fins (not shown) and the tubes 72, cools the gas to a saturation temperature. The air flow across the condenser heat exchanger 48 may be facilitated by one or more fans 74 of the condenser fan assembly 50. The condenser fans 74 may be driven by respective condenser fan motors 76 of the fan assembly 50 that may be electric and may be variable speed.

By removing latent heat, the gas within the tubes 72 condenses to a high pressure and high temperature liquid and flows to the receiver 52 that provides storage for excess liquid refrigerant during low temperature operation. From the receiver 52, the liquid refrigerant may pass through a subcooler heat exchanger 78 of the condenser heat exchanger 48, through the filter-dryer 54 that keeps the refrigerant clean and dry, then to the heat exchanger 56 that increases the refrigerant subcooling, and finally to the thermostatic expansion valve 58.

As the liquid refrigerant passes through the orifices of the expansion valve 58, some of the liquid vaporizes into a gas (i.e., flash gas). Return air from the refrigerated space (i.e., cargo compartment 40) flows over the heat transfer surface of the evaporator heat exchanger 60. As the refrigerant flows through a plurality of tubes 80 of the evaporator heat exchanger 60, the remaining liquid refrigerant absorbs heat from the return air, and in so doing, is vaporized.

The evaporator fan assembly 62 includes one or more evaporator fans 82, which may be driven by respective fan motors 84 that may be electric and may be variable speed. The air flow across the evaporator heat exchanger 60 is facilitated by the evaporator fans 82. From the evaporator heat exchanger 60, the refrigerant, in vapor form, may then flow through the suction modulation valve 64, and back to the compressor 44. A thermostatic expansion valve bulb sensor 86 may be located proximate to an outlet of the evaporator tube 80. The bulb sensor 86 is intended to control the thermostatic expansion valve 58, thereby controlling refrigerant superheat at an outlet of the evaporator tube 80. It is further contemplated and understood that the above generally describes a single stage vapor compression system that may be used for any type of refrigerant including natural refrigerants such as propane and ammonia. Other refrigerant systems may also be applied that use carbon dioxide ($CO_2$) refrigerant, and that may be a two-stage vapor compression system.

The compressor 44 and the compressor motor 46 may be linked via an interconnecting drive shaft 88. The compressor 44, the compressor motor 46 and the drive shaft 88 may all be sealed within a common housing 90. The compressor 44 may be a two-stage compressor, a scroll-type compressor or other compressors adapted to compress natural refrigerants. The natural refrigerant may be carbon dioxide ($CO_2$), propane, ammonia, or any other natural refrigerant that may include a global-warming potential (GWP) of about one (1).

Figure 3:
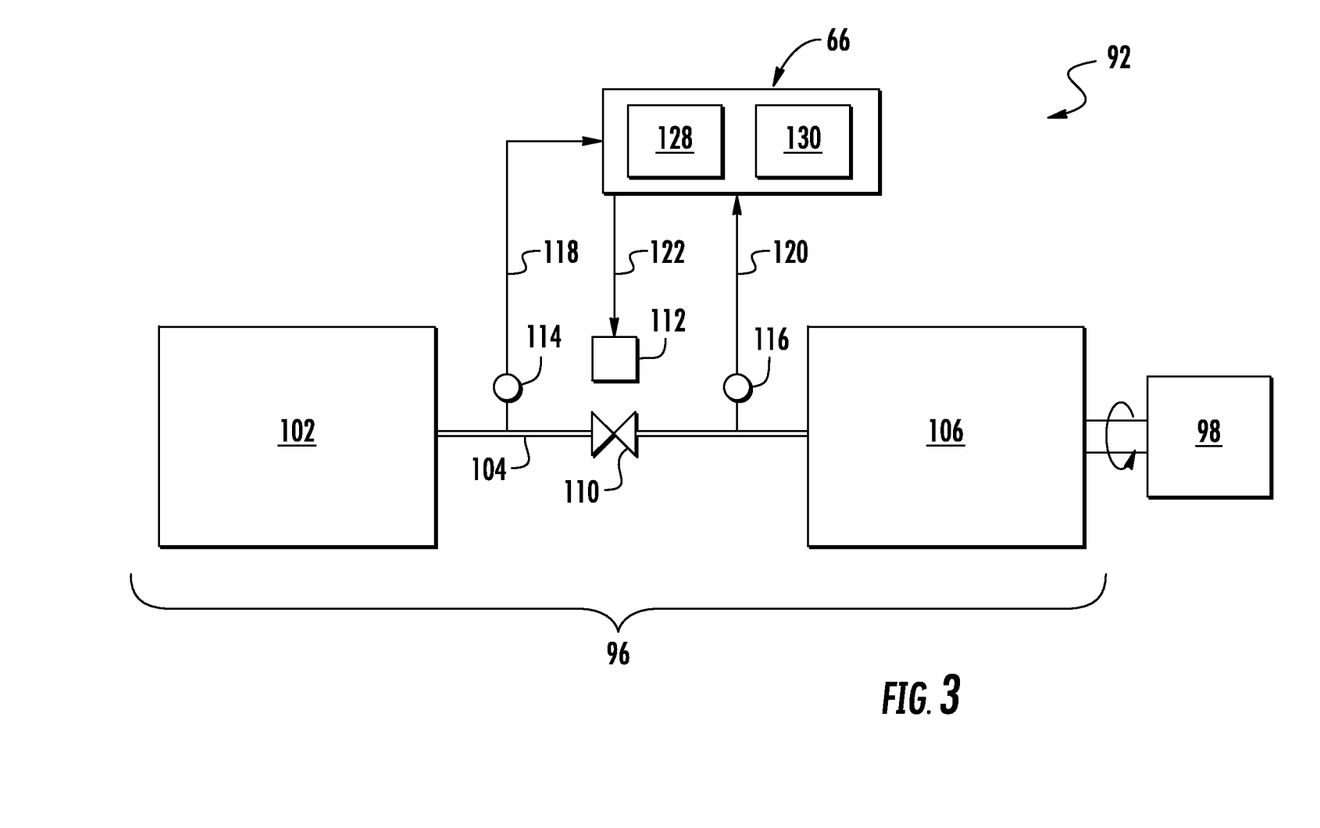
FIG. 3 is schematic of a combustion engine system of the transport refrigeration unit.

Referring to FIGS. 2 and 3, the transport refrigeration unit 26 further includes a power source 92 configured to selectively power (i.e., directly or indirectly) multiple components of the transport refrigeration unit 26. For example, the power source 92 may provide power to the compressor motor 46, the condenser fan motors 76, the evaporator fan motors 84, and other components that may include various solenoids and/or sensors. The electric power may be transferred over various buses, electrical devices and/or electrical conductors 94. The controller 66 may generally control the fan motors 76, 84, the power source 92 and other components over pathways 93, which may be wired or wireless. The power source 92 may include a combustion engine system 96, an electric generator 98, and an energy storage device 100.

In operation, the generator 98 may be mechanically driven by the combustion engine system 96, and may electrically charge the energy storage device 100. In various embodiments, the generator 98 may directly provide the electrical energy needed to run at least one of the compressor motor 46, the fan motors 76, 84, and/or other components of the transport refrigeration unit 26. In other embodiments, the transport refrigeration unit 26 may be configured to selectively choose the source of electrical power (i.e., the energy storage device 100 or directly from the generator 98).

Referring to FIG. 3, the combustion engine system 96 may output mechanical energy based on the combustion of an expandable hydrocarbon gas that may be a compressed natural gas. The engine system 96 may include the controller 66, a high pressure gas tank 102, a gas line 104, a combustion engine 106, a pressure control valve 110, an electric valve actuator 112, and upstream and downstream pressure sensors 114, 116. The gas line 104 facilitates the flow of compressed and expandable gas (e.g., natural gas) from the tank 102 and to the engine 106 for combustion. The gas line 104 may be intersected by and/or is in fluid communication with the pressure control valve 110. The pressure control valve 110 may be, or includes, a pressure regulator, and is generally operated by the actuator 112 configured to adjustably move the valve between open and closed positions. In another embodiment, it is contemplated and understood that the controller of the combustion engine system 96 may be separate from and may communicate with the controller 66 of the transport refrigeration unit 26.

The upstream pressure sensor 114 measures the gas pressure at the upstream side of the pressure control valve 110. The upstream pressure sensor 114 may be mounted to the high pressure gas tank 102, the gas line 104, or may be an integral part of the pressure control valve 110. The upstream pressure sensor 114 is further configured to send an upstream pressure signal 118 to the controller 66. The upstream pressure signal 118 is indicative of the gas pressure in the pressure gas tank 102, that when full may be about two hundred (200) bars nominal pressure. The upstream pressure signal 118 may be processed by the controller 66, and used, in-part, to alert an operator of gas levels within the tank 102, and thus any need to refuel.

The downstream pressure sensor 116 measures the gas pressure at the downstream side of the pressure control valve 110. The downstream pressure sensor 116 may be generally mounted to the combustion engine 106, the gas line 104, or may be an integral part of the pressure control valve 110. The downstream pressure sensor 116 is configured to send a downstream pressure signal 120 to the controller 66 for generally verifying the gas delivery entering the combustion engine 106 is at an operating pressure that may be about ten (10) to fifteen (15) bars. The controller 66 further utilizes the upstream and downstream pressure signals 118, 120 to determine a real-time pressure differential across the pressure control valve 110 in order to properly position the valve by sending a command signal 122 to the valve actuator 112. It is contemplated and understood that any one or more of the signals 118, 120, 122 may be sent wirelessly or over hard wired pathways.

Figure 4:
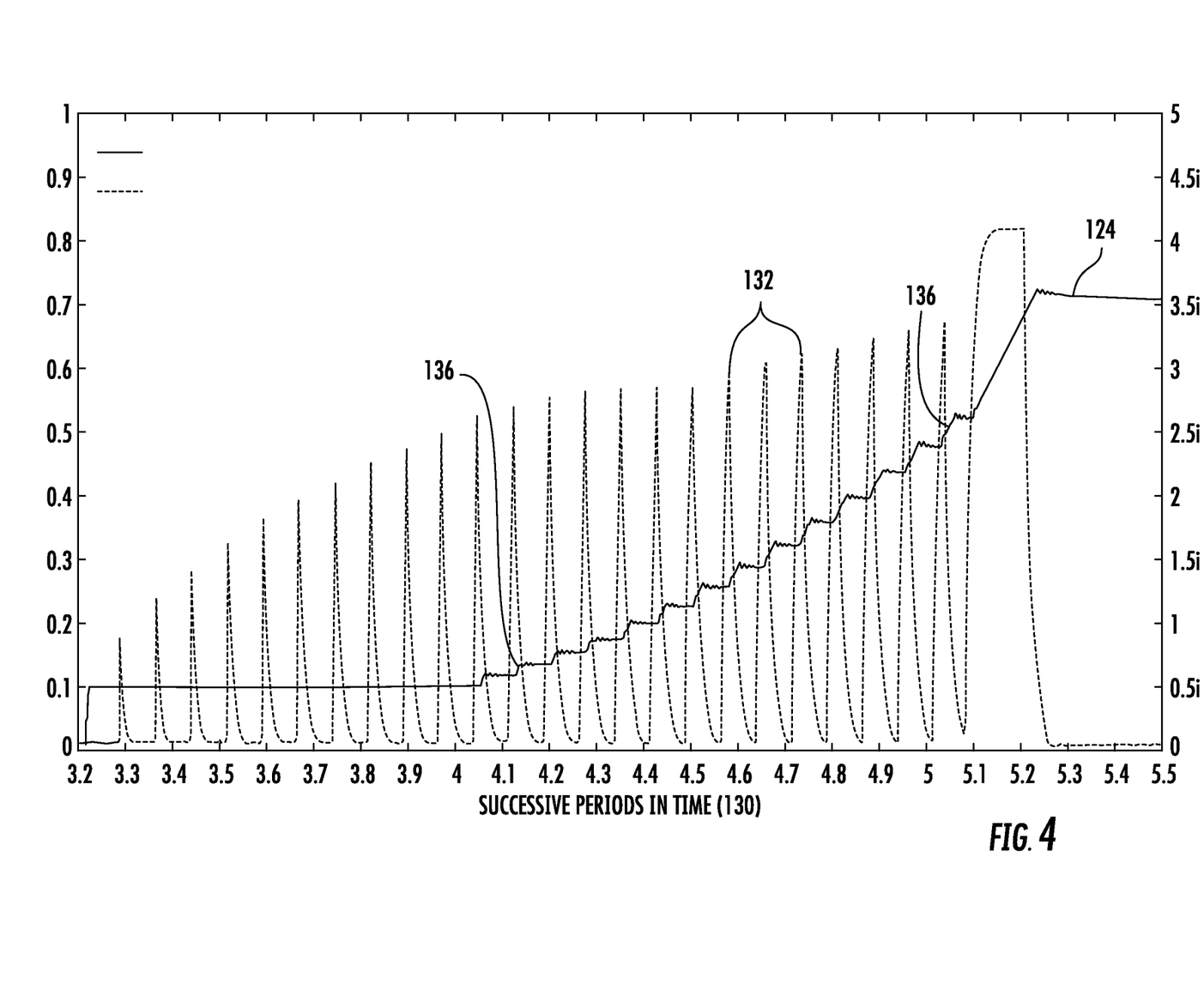
FIG. 4 is graph illustrating a pressure gradient curve.

The energy storage device 100 may be electrically charged by the generator 98 that may be part of, and dedicated to, the transport refrigeration unit 26. The energy storage device 100 may be at least one battery and/or bank of batteries. In one embodiment, the energy storage device 100 may be secured to the underside of the bottom wall 32 of the trailer 24 (see FIG. 1). Similarly, the combustion engine system 92, or components of the combustion engine system, may be secured to the underside of the bottom wall 32 of the trailer 24, or otherwise supported and carried by the trailer. It is further contemplated and understood that other examples of the energy storage device 100 may include fuel cells, and other devices capable of storing and outputting electric power Referring to FIG. 4 a graph of a pressure gradient curve 124 is illustrated along with a depiction of a plurality of sequential command signals 122, each portrayed along a common X-axis representative of a plurality of successive time periods 126. Referring to FIGS. 3 and 4, a computer readable and writeable storage medium 128 of the controller 66 may be preprogrammed with the pressure gradient curve 124 utilized by a processor 130 (e.g., microprocessor) of the controller 66 to, for example, intermittently open the pressure control valve 110 at a rate that is controlled, and in a manner that eliminates or minimizes any downstream hammer effects caused within the fuel line 104 or other components adapted to flow or contain the gas.

The pressure gradient curve 124 may assume any profile, need not be linear, and may be designed to ramp up the gas pressure downstream of the pressure control valve 110 to the operating pressure of the combustion engine 106. In one example, the operating intent may be to achieve the operating pressure as soon as possible without causing any negative effects such as the hammer effect, and/or undesired temperature extremes (i.e., due to gas expansion). The curve profile may be dependent, in part, on a variety of factors for any particular combustion engine system 96. Such factors may include maximum gas pressure at the tank 102, operating gas pressure at the combustion engine 106, sizing and orientations of various components (e.g., gas line 104) adapted to flow the gas, and other factors.

Referring to FIG. 4, the X-axis may represent a plurality of successive periods in time 132. In one example, each period in time 132 may be equivalent to the next period in time, and may be about 0.1 seconds. The Y-axis associated with the pressure gradient curve 124 may represent a pressure gradient that increases with an increasing number of periods in time 132. The Y-axis associated with the plurality of sequential command signals 122 may represent a magnitude of electrical energy (e.g., current) that each command signal 122 delivers to the valve actuator 112. More specifically, the plurality of command signals 122 portrayed on the graph, may each represent, respective, sequential valve opening events. Each command signal 122 may then be a power pulse that lasts for a time period that is about equal to or less than the associated period in time 132. In one embodiment, the electrical current of each power pulse may be controlled by the controller 66 and is variable from one pulse to the next in order to achieve the desired pressure gradient (i.e., progressive pressure increase downstream of the pressure control valve 110) for each successive period in time 132. It is contemplated and understood that a similar pressure gradient curve and process may be utilized to reposition the pressure control valve 110 toward the closed position.

It is further contemplated and understood that the pressure control valve 110, the actuator 112, the pressure sensors 114, 116 and the controller 66 may be, or may be part of a pressure control valve system. The pressure control valve system, or portions thereof, may be packaged as a single unit for use as described herein, or in any other application that may, or may not, include a combustion engine.

Figure 5:
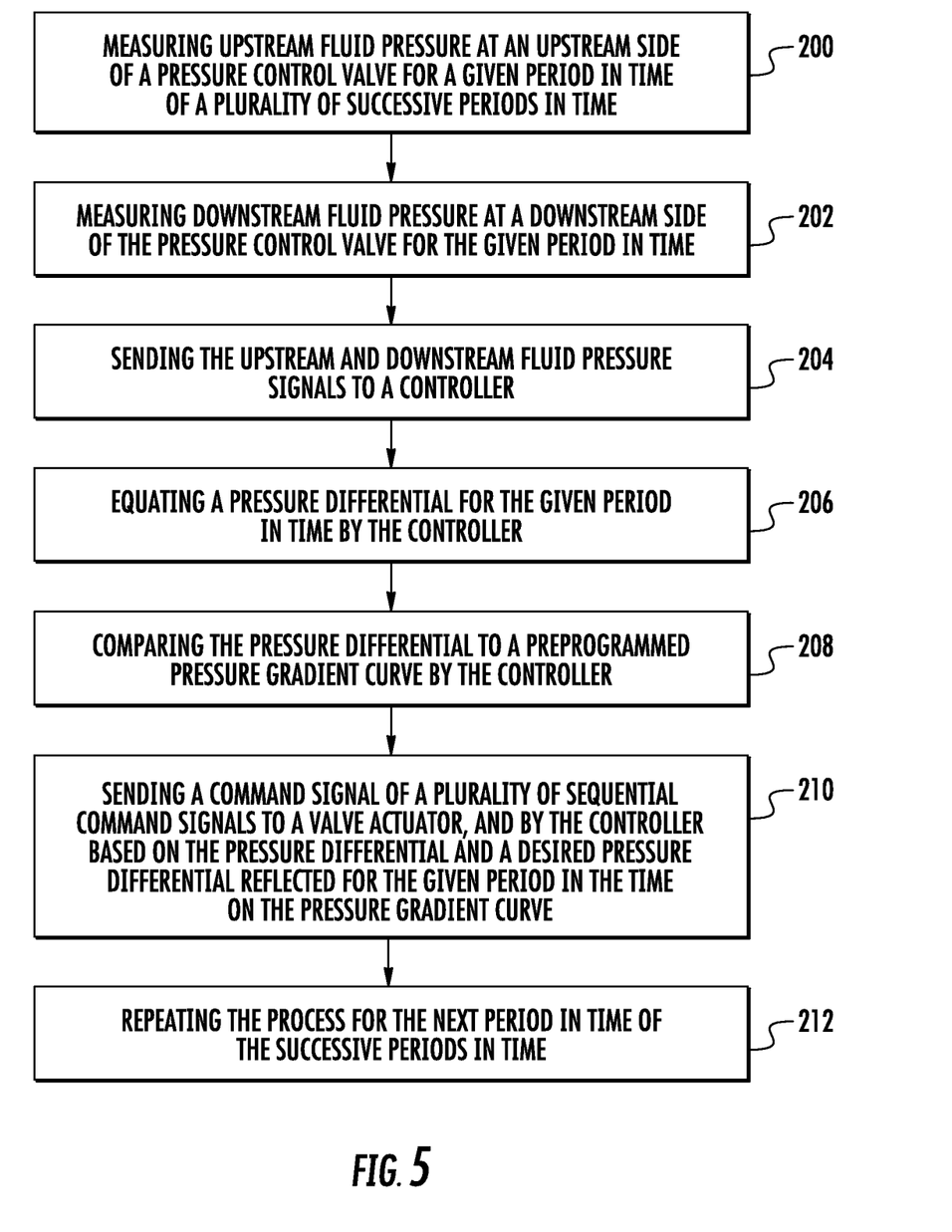
FIG. 5 is a flow chart of a method of operating a pressure control valve system of the combustion engine system.

Referring to FIG. 5, a process of opening a pressure control valve 110 of a combustion engine system 96 that utilized a compressed, expandable, gas is illustrated. At block 200, a fluid pressure is measured by pressure sensor 114 positioned upstream of the pressure control valve 110, and for a given period in time of a plurality of successive periods in time 130. At block 202, a fluid pressure is measured by pressure sensor 116 positioned downstream of the pressure control valve 110 and for the given period in time of the plurality of successive periods in time 130. At block 204, the upstream and downstream fluid pressures (i.e., associated signals 118, 120), for the given period in time, is sent to the controller 66. At block 206, the controller 66 calculates a pressure differential associated with the upstream and downstream pressures for the given period in time. At block 208, the controller 66 compares the pressure differential to a preprogrammed pressure gradient curve 124. At block 210, the controller 66 sends a command signal 122 to the valve actuator 112, wherein the command signal is associated with the pressure differential and a desired pressure differential 136 reflected for the given period in time on the pressure gradient curve 124. At block 212, the process may repeat itself for the next successive period in time.

Advantages and benefits of the present disclosure include a pressure control valve system capable of controlling the opening speed of a pressure control valve for eliminating or reducing negative effects of pressure differentials across the valve. Other benefits include a more robust system requiring less maintenance.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressure control valve system comprising:
a pressure control valve;
an electric actuator configured to adjustably open and close the pressure control valve;
an upstream pressure sensor configured to measure pressure upstream of the pressure control valve and output a plurality of sequential upstream pressure signals over a plurality of successive periods in time;
a downstream pressure sensor configured to measure pressure downstream of the pressure control valve and output a plurality of sequential downstream pressure signals over the plurality of successive periods in time; and
a controller configured to receive the upstream and downstream pressure signals and output a plurality of sequential command signals to the electric actuator, wherein each sequential command signal is based on a respective one of the plurality of sequential downstream and upstream pressure signals for a respective one of the plurality of successive periods in time, wherein the controller includes a processor and a computer readable storage medium, wherein the controller is preprogrammed with a pressure gradient curve associated with the plurality of successive periods in time, wherein the controller is configured to calculate a change in a pressure gradient for each period in time of the plurality of successive periods in time based on measurements taken by the upstream and downstream pressure sensors, and the plurality of sequential command signals are based on the pressure gradient curve and to achieve the pressure gradient for each one of the plurality of successive periods in time.

2. The pressure control valve system set forth in claim 1, wherein each period in time of the plurality of successive periods in time are equal to one-another.

3. The pressure control valve system set forth in claim 1, wherein the pressure control valve flows an expandable gas.

4. The pressure control valve system set forth in claim 1, wherein the plurality of sequential command signals are each associated with a variable electric power sent to the electric actuator to control speed of the pressure control valve.

5. The pressure control valve system set forth in claim 1, wherein the plurality of sequential command signals are a plurality of sequential open command signals.

6. The pressure control valve system set forth in claim 1, wherein the plurality of sequential command signals are a plurality of sequential open command signals and the pressure gradient curve is preprogrammed to prevent hammer fluid effects.

7. The pressure control valve system set forth in in claim 6, wherein the plurality of sequential open command signals causes a progressive opening of the pressure control valve.

8. The pressure control valve system set forth in claim 7, wherein each one of the plurality of sequential open command signals is a pulse lasting for a time period that is equivalent to or less than each one of the plurality of periods in time.

9. A transport refrigeration unit comprising:
a compressor constructed and arranged to compress a refrigerant;
a combustion engine constructed and arranged to generate power for running at least the compressor;
a high pressure gas tank;
a gas line connected between the high pressure gas tank and the combustion engine for flowing a hydrocarbon gas from the high pressure gas tank to the combustion engine;
a pressure control valve disposed in the gas line;
an electric actuator constructed and arranged to reposition the pressure control valve between closed and open positions thereby controlling a pressure differential of the hydrocarbon gas across the pressure control valve;
an upstream pressure sensor configured to measure pressure upstream of the pressure control valve and output a plurality of sequential upstream pressure signals over a plurality of successive periods in time;
a downstream pressure sensor configured to measure pressure downstream of the pressure control valve and output a plurality of sequential downstream pressure signals over the plurality of successive periods in time; and
a controller configured to receive the upstream and downstream pressure signals and output a plurality of sequential command signals to the electric actuator, wherein each sequential command signal is based on a respective one of the plurality of sequential downstream and upstream pressure signals for a respective one of the plurality of successive periods in time, wherein each period in time of the plurality of successive periods in time are equal to one-another, wherein each one of the plurality of sequential command signals is a pulse of power for operating the electric actuator and lasting for a time period that is equivalent to or less than each one of the plurality of periods in time, wherein the controller is preprogrammed with a pressure gradient curve associated with the plurality of successive periods in time, wherein the controller is configured to calculate a change in a pressure gradient for each period in time of the plurality of successive periods in time based on measurements taken by the upstream and downstream pressure sensors, and the plurality of sequential command signals are based on the pressure gradient curve and to achieve the pressure gradient for each one of the plurality of successive periods in time.

10. The transport refrigeration unit set forth in claim 9, wherein the hydrocarbon gas is a compressed natural gas.

11. The transport refrigeration unit set forth in claim 9, wherein each one of the plurality of sequential command signals includes an electric current that is different than an electric current of another sequential command signal for varying operating speed of the pressure control valve from one period in time of the plurality of successive periods in time to the next period in time.

12. The transport refrigeration unit set forth in claim 11, wherein the plurality of sequential command signals are a plurality of sequential open command signals.

13. The transport refrigeration unit set forth in claim 12, wherein the plurality of sequential open command signals causes a progressive opening of the pressure control valve.

14. The transport refrigeration unit set forth in claim 10, wherein the compressed natural gas in the high pressure gas tank is at a maximum of 200 bars nominal pressure, and the natural gas located downstream of the pressure control valve is at 10 to 15 bars service pressure.

* * * * *